April 9, 1935.   A. Y. DODGE   1,996,795
LUBRICATING DEVICE
Filed Sept. 17, 1931   2 Sheets-Sheet 1
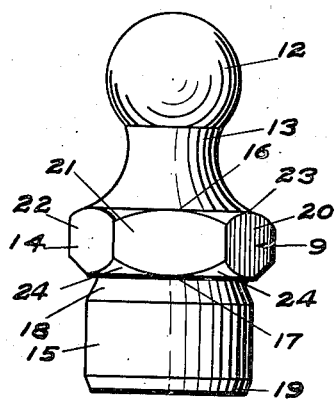
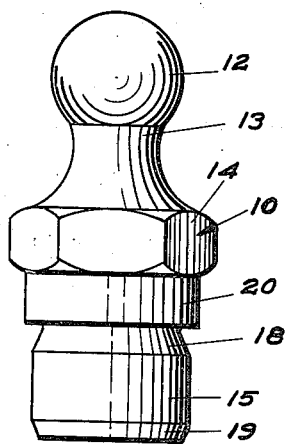
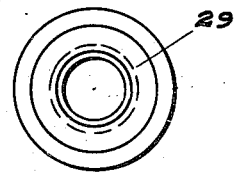
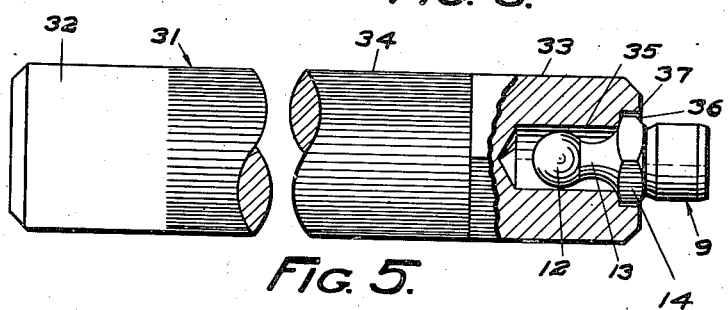
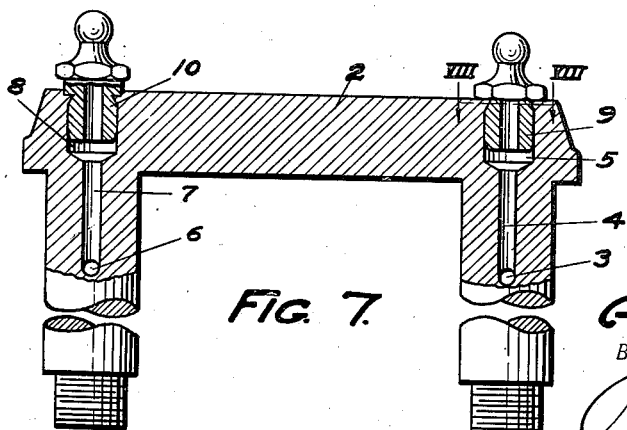
INVENTOR.
ADIEL Y. DODGE
BY
ATTORNEY.

April 9, 1935.  A. Y. DODGE  1,996,795
LUBRICATING DEVICE
Filed Sept. 17, 1931   2 Sheets-Sheet 2

INVENTOR.
ADIEL Y. DODGE
BY
ATTORNEY.

Patented Apr. 9, 1935

1,996,795

UNITED STATES PATENT OFFICE 1,996,795

LUBRICATING DEVICE

Adiel Y. Dodge, South Bend, Ind., assignor to The Lubrication Corporation, South Bend, Ind., a corporation of Delaware Application September 17, 1931, Serial No. 563,419

5 Claims. (Cl. 285—25)

This invention relates to lubrication devices and more particularly to lubrication fittings and to methods of and means for securing and withdrawing the same.

Prior to my invention fittings provided for the purpose of feeding lubricant to bearings have usually been either screw fittings or friction type drive fittings. In securing a screw type fitting in proper association with the bearings to be lubricated, it is necessary that the fitting itself be threaded, that the bore into which the fitting is to be screwed be threaded or tapped, and that the fitting be screwed into the bore. All of these operations require considerable time and are relatively expensive.

In securing friction type drive fittings within bores, it is necessary that manufacturing tolerances be held down rigorously in order that a tight fit may be obtained. For instance, in one common type of drive fitting the diameter of the bore into which the fitting is to be secured should be allowed a tolerance of no more than plus or minus 0.001 inch. As it is almost impossible to hold this tolerance by ordinary drilling the bore must be reamed after being drilled if a lubricant tight fit is to be assured. In spite of these precautions, friction type drive fittings cannot be used where high pressure lubrication is desired inasmuch as the high pressure sometimes built up under the fitting in lubrication bearings will blow the fitting from the bore, since it is merely held in place by slight frictional contact.

It is proposed in the corresponding application of John A. Watson, Ser. #563,416, filed September 17, 1931, assigned to the same assignee, to form lubrication fittings with square shouldered annular grooves and the like, and to lock the fittings in the receiving bores by driving or otherwise displacing metal from the bodies having the bores into the grooves by the use of a driving tool. However, I have discovered that excellent results as far as practical results are concerned, may be obtained, where the fitting is fairly strong, by using a shoulder of the fitting itself to displace the metal into the groove and furthermore that by a proper shaping of the groove and a selected shaping of the shoulder it is possible to withdraw the fitting from the bore with a relatively small expenditure of energy, also accomplishing, by the withdrawal, an ironing out of the bore so that it is in proper condition to receive the same or a replacement fitting of the same type. With these improvements it is possible to reduce manufacturing and tool expense. By utilizing the fitting shoulder for displacing the metal, it is possible to decrease tool expense, and it is possible to decrease the force or energy required to drive and lock the fitting in the bore while by the shape of the shoulder it is possible to facilitate the replacement of fittings.

The expressions "drive shoulder", "drive portion" and the like, as used in this description and the claims, mean a shoulder or similar or equivalent element which acts, under the influence of a force applied thereto, to deform, flow, displace, or otherwise effect a movement of the material of the member into which the fitting is driven, to an extent sufficient to engage such deformed, flowed, displaced or otherwise affected material in the groove or the like in the fitting; the fitting becoming self-locking thereby.

One of the objects of my invention is to provide a lubrication fitting capable of withstanding high pressures, but one which is nevertheless relatively inexpensive to make and attach.

A further object of my invention is to provide an improved fitting of the character indicated capable of being easily replaced.

A further object of my invention is to provide an improved tool for securing lubrication fittings in bores and for withdrawing said fittings from said bores.

Further objects are to provide methods for securing and withdrawing lubrication fittings from bores.

Further objects will be apparent after a reading of the subjoined specification and claims and after a consideration of the accompanying drawings.

In general the drawings disclose a fitting having a ball head, a reduced neck, an enlarged wrench receiving portion and a generally cylindrical shank. The side of the wrench receiving portion adjacent to the head forms a drive receiving shoulder upon which a drive tool may be seated for forcing the fitting into a bore. The opposite side thereof forms a driving shoulder which contacts with the metal of the body in which the bore is formed and displaces the metal from the body into an annular groove formed in the shank portion of the fitting. The shank portion, moreover, is formed with a sloping drive starting shoulder by means of which the fitting may be initially positioned in the bore. The drive tool may extend only to contact with the top of the wrench receiving portion or may, in a preferred form, be provided with an extension or a plurality of extensions adapted to contact with the sides of the wrench receiving portion and thus support said portion of the fitting while the drive shoulder is displacing metal into the groove.

The extensions are also adapted to serve as a socket wrench for turning the fitting in the operation of withdrawing it from the bore for the purpose of replacing the fitting. The lower side or shank side of the wrench receiving portion (that is to say, the drive shoulder) is so shaped that upon rotation of the fitting in the withdrawing operation, the shoulder cams upon the body in which the fitting is secured and initiates the withdrawal of the fitting. Furthermore, by the rotation of the fitting and the withdrawal thereof, the interior of the bore is smoothed out and the locking projection is forced back into smooth relationship, with the side of the bore so that a new fitting may be easily substituted.

In order to explain the invention more clearly several embodiments thereof are shown in the accompanying drawings, in which:

Figure 1 is a view in elevation showing a fitting constructed according to my invention;

Figure 2 is a view in elevation showing a modified form of fitting;

Figure 3 is a view partly in elevation and partly in section showing the fitting of Figure 1 and a drive tool associated therewith;

Figure 4 is a bottom plan view of the tool shown in Figure 3;

Figure 5 is a fragmentary view partly in elevation and partly in section showing the fitting of Figure 1, and a different form of drive tool associated therewith;

Figure 6 is a bottom plan view of the tool shown in Figure 5;

Figure 7 is a fragmentary view partly in section and partly in elevation showing a shackle bolt having a pair of fittings, similar to the fitting shown in Figure 1 secured therein;

Figure 8:
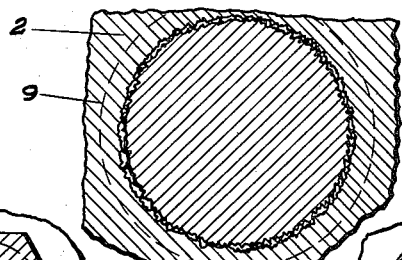
Figure 8 is a fragmentary view in section taken substantially on the line VIII—VIII of Figure 7, but shown on an enlarged and exaggerated scale.
Figure 10:
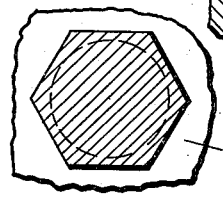
Figure 10 is a view in section taken substantially on the line X—X of Figure 9.
Figure 12:
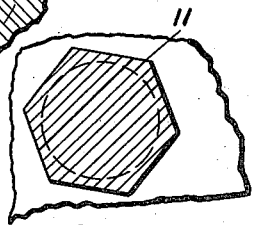
Figure 12 is a view in section taken substantially on the line XII—XII of Figure 11.

Referring particularly to Figure 7 of the drawings, I have shown a shackle bolt 2 provided with a plurality of bores such as 3, 4, and 5, and 6, 7, and 8. In the bores 5 and 8 there are positioned lubrication fittings 9 and 10 which are shown on a larger scale in Figures 1 and 2.

The fitting 9 of Figure 1 is provided with a ball head 12, a reduced neck portion 13, an enlarged wrench receiving portion 14, and a cylindrical shank 15. The wrench receiving portion 14 is provided with an upper annular driving shoulder 16 and a lower annular driven shoulder 17. The shank 15, is adjacent to the wrench receiving portion 14, is formed with an annular groove 18, the lower side of which is slanted and is also provided with a slanted starting shoulder 19. The driven shoulder 17 is adapted to contact with the metal of the member into which the fitting is being driven and to displace part of the metal adjacent to the bore into the groove 18. To accomplish this purpose the ability of the shoulder to withstand strain should be approximately as good as the corresponding ability of the part into which the fitting is being driven. For example, the strength of the shoulder 14 should be at least nearly as great as the strength of the shackle 2. However, it is possible by reason of the greater lateral support given the shoulder 14 even to secure a softer fitting within a harder shackle.

The wrench receiving portion is flat sided having facets such as 20, 21 and 22 for receiving a wrench or other tool so that the fitting may be rotated. Each of the points formed between the facets preferably is beveled as at 23, 24, 25 and 26, and this construction as applied to the lower shoulder 17 is capable of accomplishing a novel function in the withdrawal of the fitting from the bore, as will be later more fully described.

The fitting 10 also is shown on an enlarged scale in Figure 2 and inasmuch as many parts are exactly like corresponding parts of the fitting 9 they will be designated by like numerals and only unsimilar parts will be described in detail. The wrench receiving portion 10 in this form of fitting is not utilized directly for driving metal into the groove 18, but intermediate said portion 14 and said groove 18 there is provided a cylindrical shoulder portion 20 which is of smaller diameter than the portion 14, but of larger diameter than the diameter of the shank 15. Thus the lower shoulder of the portion 20 is adapted to contact with the metal adjacent to the bore into which the fitting is driven (e. g. the metal of the shackle 2) and drive this metal into the groove 18 to lock the fitting in the bore.

In Figure 3, there is shown a tool 25 provided with a driven head 26, a driving head 27, and a knurled portion 28. The driving head 27 is formed with a central bore 29 adapted to receive the ball head 12 and the neck 13, and counterbored at 29a to insure against breaking the ball head of the fitting. The lower end of the head 27 is formed with an annular driving shoulder 30 which is adapted to contact with the shoulder 16 for driving the fitting into a bore.

In Figures 5 and 6, there is shown a driving tool 31 formed with a driven head 32, a driving head 33, and a central knurled portion 34. The driving head 33 is formed with a central bore 35 for receiving the ball head 12 and neck portion 13 of the fitting 9. It is furthermore formed with a hexagon shaped recess 36 for receiving the wrench receiving portion 14 of the fitting 9. Thus the portion of the tool surrounding the recess 36 forms a projection 37 which is somewhat annular in shape and which contacts with the wrench receiving portion 14 and supports said wrench receiving portion while the fitting is being driven into the body provided with the bore and while it is being locked therein. Moreover, the recess 36 forms a socket wrench for holding the fitting and for aiding in turning it for withdrawal. As may be seen most clearly in Fig. 5 the exterior of the head 33 is also hexagon shaped and thus is capable of receiving a wrench so that the tool itself may be turned and thus may turn the fitting.

In the process of assembling a fitting such as 9 or 19 in a bore such as one of the bores 5 or 8, the starting shoulder 19 is first positioned within the entrance to the bore. Then a tool such as one of the tools 25 or 31 is positioned over the fitting and the driving shoulder of the tool (such as 29 or 37) is brought into contact with the drive shoulder 16 of the fitting. A blow or a plurality of blows with a hammer upon the head 26 or the head 32 forces the fitting into the bore. The lower side or driven shoulder 17 of the portion 14 contacts with the metal of the body 2 adjacent to the bore and displaces the metal downward and inward into the annular groove 18, thus locking the fitting within the bore. If the tool 31 is used, it is to be noted that the projection 37 surrounding the recess 36 supports and gives further strength to the portion 14 as the driven shoulder 17 operates to displace the metal. The metal displaced into the groove 18 may have an appearance under a microscope somewhat suggesting that shown in Figure 8, but the showing of Figure 8 is very much exaggerated inasmuch as the joint between the two metals appears quite even to the naked eye. It may be said that by reason of the fact that one side of the groove is slanted, the metal flows uniformly into the groove and locks the fitting firmly within the bore.

Figure 9:
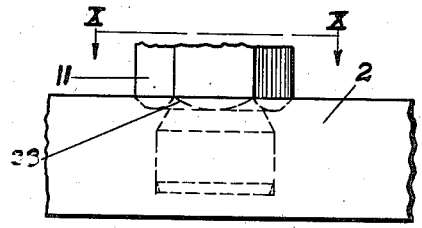
Figure 9 is a fragmentary view in elevation showing on an enlarged scale the fitting of Figure 1 inserted in a bore.
Figure 11:
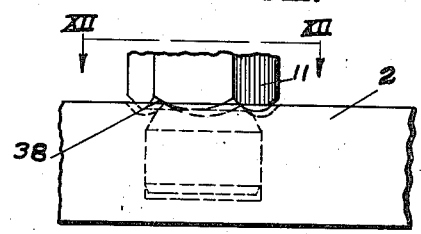
Figure 11 is a view similar to Figure 9 showing the fitting rotated and partially loosened from the bore.
Figure 14:
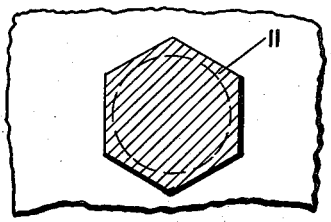
Figure 14 is a view in section taken substantially on the line XIV—XIV of Figure 13.
Figure 16:
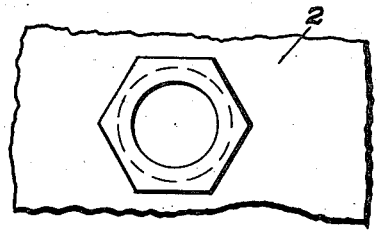
Figure 16 is a view in top plan of the body shown in Figure 15.
Figure 13:
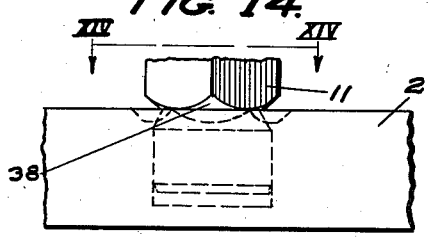
Figure 13 is a view similar to Figures 9 and 11 showing the fitting further loosened in the bore.
Figure 15:
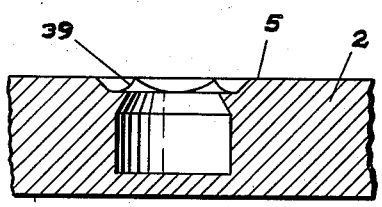
Figure 15 is a view in vertical section showing the bore as it would appear if the fitting were removed therefrom without displacing the metal of the bore from the position which it occupies when the fitting is in the bore.

In the process of withdrawing a fitting such as the fitting 9 from the bore 5, a tool such as the tool 31 is positioned over the fitting so that the projections 37 and the recess 36 embrace the wrench receiving portion. Thereafter, a wrench is placed on the hexagonal outer surface of the head 33 and by rotation of the wrench and the tool, the fitting 9 is turned from the position shown in Figure 9 to the position shown in Figure 11, and then to the position shown in Figure 13, which causes the lower cam shaped surface of the shoulder 17 to ride up upon the irregular surface 39 of the metal adjacent to the bore 5, thus causing the fitting to start to move out of the bore. In its movement out of the bore the slanting side of the groove 18 forces the metal which has been previously forced into the groove out of the groove back toward its original position, thus smoothing out the sides of the bore. Moreover, the rotation of the fitting in the bore tends to ream out the bore and smooths out the irregularities shown in Figure 8 so that a new fitting may be easily inserted to replace the one being withdrawn.

By way of example and not by way of limitation, I will set out below dimensions in inches and angles in degrees which have been found to be most satisfactory for one size of my improved drive type fitting. The ball head 12 of the fitting is formed with a radius of substantially 0.250 in. and the wrench receiving portion 14 is formed from 0.344 inch hexagon steel stock. The cylindrical portion 15 has a diameter of 0.317 inch, a tolerance of plus or minus 0.001 inch being allowed. The width of the annular groove 18 is 0.046 inch, and the depth of the groove is 0.0195 inch, the slope of the slanting shoulder thus approximating 23 degrees. The slanted shoulder 19 has a length of 0.031 in., while the smallest diameter of the groove is 0.278 inch, a tolerance of plus or minus 0.002 inch being allowed. With a fitting of this construction, a bore in the receiving part may have a diameter varying from 0.310 inch to 0.317 inch and the bore need not be reamed.

In a friction type drive fitting having comparable dimensions and constructed according to the usual practice, the cylindrical portion of the fitting corresponding to the portion 15 has a diameter of about 0.317 inch, a tolerance of about plus or minus 0.0005 inch being allowed. The bore is drilled with a diameter of 0.3125 inch, and a tolerance of only plus or minus 0.001 inch is allowed. Moreover, after the drilling operation is completed it is necessary in the friction type drive fitting under consideration to ream the bore so as to attempt to secure a lubricant tight fitting. In spite of all of these precautions, it has been found that the ordinary drive fittings described blow out under very low lubricant pressures, whereas a fitting constructed as described above will withstand more than 10,000 pounds pressure without blowing out or leaking.

Thus I have provided a lubrication fitting which is relatively inexpensive to make, which requires only an inexpensive drilling operation in forming a bore for its reception, which allows relatively large tolerances in the drilling operation and which may be relatively inexpensively secured within the bore. Moreover, the fitting provided will be securely held within the bore and will not be blown out by high lubricant pressures. The fitting provided not only can be easily secured in lubricant tight relationship, but also can be easily removed, leaving the bore in proper condition to receive a new or replacement fitting.

It is to be understood that the above embodiments of the invention are for the purpose of illustration only, and various changes may be made therein without departing from the spirit and scope of the invention.

I claim:

1. A lubrication fitting adapted to be forced into a receiving member by pressure or impact, said fitting having a drive shoulder to effect interlocking between the receiving member and the fitting, a head portion, an intermediate portion, said fitting having a plurality of flat lateral surfaces above and adjacent to said shoulder, the corners formed by the junctions between said surfaces being bevelled off at places adjacent to said shoulder.

2. A lubrication fitting having a ball head, a reduced neck, a flat sided wrench receiving portion forming a driving means to effect interlocking between a receiving member and the fitting, and a cylindrical shank having a lesser diameter than the diameter of said wrench receiving portion and having an annular groove formed therein at its end adjacent to said wrench receiving portion, the side of said groove remote from said wrench receiving portion being inclined relative to the axis of the fitting.

3. A lubrication fitting including a ball head, a reduced neck, a flat sided wrench receiving portion adapted to effect interlocking between said fitting and a receiving member, and a cylindrical shank having a lesser diameter than the diameter of said wrench receiving portion and having an annular groove formed therein at its end adjacent to said wrench receiving portion, one side of said groove being inclined relative to the axis of the fitting and the opposite side of said groove being relatively perpendicular to the axis of the fitting, said perpendicular side of the groove being substantially parallel to the adjacent face of said wrench receiving portion.

4. A lubrication drive fitting including a shank adapted to be driven into a receiving member and having an annular depression in the outermost surface of its shank, the upper surface defining said depression being substantially perpendicular to the axis of the shank at its inner region and diverging from the perpendicular at its outer region, said upper surface providing a shoulder adapted to displace metal from the receiving member into said depression.

5. A lubrication drive fitting adapted to be secured in a recess in a metal bearing member and having a shank formed with a depression, a drive shoulder on said fitting for forcing metal adjacent to the recess into which said fitting is driven into said depression, said shoulder being formed to extend beyond the outermost wall of said shank and having said extended portion chamfered.

ADIEL Y. DODGE.